United States Patent
Sizikov et al.

(10) Patent No.: US 9,454,503 B1
(45) Date of Patent: Sep. 27, 2016

(54) HOT SWAP DECOUPLING FOR NOISE REDUCTION AND FAILURE PREVENTION

(71) Applicant: Google Inc., Mountain View, CA (US)

(72) Inventors: Gregory Sizikov, Cupertino, CA (US); WeiFeng Pan, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 505 days.

(21) Appl. No.: 13/963,624

(22) Filed: Aug. 9, 2013

(51) Int. Cl.
*G06F 13/00* (2006.01)
*G06F 13/40* (2006.01)

(52) U.S. Cl.
CPC ................... *G06F 13/4081* (2013.01)

(58) Field of Classification Search
CPC ............ G06F 13/4022; G06F 3/0635; G06F 13/4081; G06F 1/1632
USPC ................... 710/300–306, 316–317
See application file for complete search history.

(56) References Cited

U.S. PATENT DOCUMENTS

| | | | |
|---|---|---|---|
| 5,272,584 A | 12/1993 | Austruy et al. | |
| 5,789,964 A | 8/1998 | Voldman | |
| 6,724,592 B1 | 4/2004 | Tong et al. | |
| 6,771,478 B2 * | 8/2004 | Ochi | H02H 9/004 361/118 |
| 6,781,502 B1 | 8/2004 | Robb | |
| 7,049,796 B2 | 5/2006 | Cherniski et al. | |
| 8,188,615 B2 | 5/2012 | Du et al. | |
| 8,278,997 B1 | 10/2012 | Kim et al. | |
| 2008/0249666 A1 * | 10/2008 | Buterbaugh | G06F 1/28 700/293 |
| 2010/0315748 A1 | 12/2010 | Kwong et al. | |
| 2012/0293012 A1 * | 11/2012 | Kumar | H02M 3/06 307/109 |

OTHER PUBLICATIONS

O'Sullivan, Marcus Understanding Hot Swap: Example of Hot-Swap Circuit Design Processing, Analog Dialogue 42-05, May 2008, 5 pages.

* cited by examiner

*Primary Examiner* — Tim T Vo
*Assistant Examiner* — Kim T. Huynh
(74) *Attorney, Agent, or Firm* — Fish & Richardson P.C.

(57) ABSTRACT

An apparatus for selectively connecting a decoupling capacitor in parallel with a load on a power bus during a hot swap power up. In an aspect, an apparatus includes a capacitive coupling connected to a hot swap control circuit and that capacitively couples first and second power conductors when the output of the hot swap control circuit indicates a monitored load has attained a voltage threshold.

13 Claims, 1 Drawing Sheet

HOT SWAP DECOUPLING FOR NOISE REDUCTION AND FAILURE PREVENTION

BACKGROUND

This specification relates to power controllers for sensing and controlling power during hot swaps.

A hot swap power controller facilitates the addition of electrical devices to a system without removing power from other electrical devices in the system. An example of the use of a hot swap power controller is in a server rack, where server devices may be added by inserting the server devices while other server devices in the server rack and on the same power bus remain powered. When the server device is coupled to the server rack, and thus to the power bus, the hot swap controller monitors the supply voltage and other conditions, such as current, and can control the power up of the server device so as to avoid transients, such as excessive inrush currents. Once the server device reaches a powered state that meets a threshold, the hot swap power controller generates a "power good" signal to indicate to the server processor (or other system components) that the server device is now operable.

If a hot swap controller is not used, the server device may introduce a considerable capacitive load to the power bus. Because the capacitive load may be uncharged, it may demand a large inrush current to charge. The large inrush current, in turn, reduces the power bus voltage, which may cause brownouts among other electronic devices powered by the power bus.

Additionally, decoupling capacitors are used to smooth the voltage on a power bus. Due to limited bandwidth, power supplies cannot respond to instantaneous current changes that a capacitive load may introduce. To compensate for the changes in current, decoupling capacitors are connected across the power bus, from the supply conductor to the return conductor. The decoupling capacitors add a fast charge storage near the load that provides charge to the load. Accordingly, the use of the decoupling capacitor reduces the transients in the power supply voltage resulting from changes in the load current.

SUMMARY

In general, one innovative aspect of the subject matter described in this specification can be embodied in an apparatus that includes a capacitive load having first and second terminals, the first terminal configured to be in electrical connection with a first conductor of a power bus; a switching device having first and second terminals and an control input, the first and second terminals being in electrical connection when the switching device is in a closed state and being in electrical isolation from each other when the switching device is in an open state, wherein the first terminal of the switching device is in electrical connection with the second terminal of the capacitive load, and the second terminal of the switching device is configured to be in electrical connection with a second conductor of the power bus; and a hot swap control circuit configured to be in electrical connection with a load that is powered by the first and second conductors of the power bus, and that monitors an electrical state of the load while the load transitions from an unpowered state to a fully powered state in response to the load being connected to the first and second conductors of the power bus, wherein the hot swap control circuit outputs a first signal indicative of the electrical state of the load meeting a first threshold during the transition from the unpowered state to the fully powered state, and outputs a second signal indicative of the electrical state of the load not meeting a first threshold during the transition from the unpowered state to the fully powered state, and the input of the switching device receives the output of the hot swap control circuit and is in the closed state when the first signal is output by the hot swap control circuit and is in the open state when the second signal is output by the hot swap control circuit. Other embodiments of this aspect include corresponding methods.

Another innovative aspect of the subject matter described in this specification can be embodied in an apparatus that includes a server rack configured to receive computer servers and electrically connecting each computer server to a power bus that includes a first conductor and a second conductor; a capacitive load having first and second terminals, the first terminal be in electrical connection with the first conductor of the power bus; a switching device having first and second terminals and an control input, the first and second terminals being in electrical connection when the switching device is in a closed state and being in electrical isolation from each other when the switching device is in an open state, wherein the first terminal of the switching device is in electrical connection with the second terminal of the capacitive load and the second terminal of the switching device is in electrical connection with a second conductor of the power bus; and the control input is configured to be in electrical connection with an output of a control circuit when a computer server is received in the server rack, the control circuit in electrical connection with server and that monitors an electrical state of the server while the server transitions from an unpowered state to a fully powered state in response to being connected to the first and second conductors of the power bus, wherein the control circuit outputs a first signal indicative of the electrical state of the server computer meeting a first threshold during the transition from the unpowered state to the fully powered state, and outputs a second signal indicative of the electrical state of the computer server not meeting a first threshold during the transition from the unpowered state to the fully powered state; and the switching device, in response to the output of the control circuit, is in the closed state when the first signal is output by the control circuit and is in the open state when the second signal is output by the control circuit. Other embodiments of this aspect include corresponding methods.

Particular embodiments of the subject matter described in this specification can be implemented so as to realize one or more of the following advantages. The hot swap decoupling apparatus selectively removes the decoupling capacitor during a hot swap event, which reduces power bus noise that would otherwise result from charging the decoupling capacitor. However, once the hot swap controller generates the power good signal, the decoupling capacitor is reconnected across the power bus, which then reduces the susceptibility of the power bus to voltage fluctuations due to changes in load current resulting from neighboring hot swap events. Thus the benefit of the decoupling capacitor during normal load operation is realized without the drawback during the hot swap power up. This enables systems to be less dependent on individual hot swap controllers noise immunity limitations, and provides more flexibility in power distribution design.

Some systems increase noise immunity by including an inductor (or ferrite bead) in the power path. Those components are serial and add to the constant losses during server operation. In some implementations of the systems described herein, no serial components are needed, so there is no additional power loss cause during normal operation. The hot swap decoupling apparatus can obviate the need for constant capacitors being added to the power distribution bus, thereby eliminating the addition of extra load to the rectifiers. Furthermore, the effective serial resistance of the capacitor by switch can be controlled by selection of a particular field effect transistor (FET) or selection of an explicit resistor. Such tuning allows for damping control due to the resulting RC time constant.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The subject matter of this written description relates to hot swap decoupling and coupling of a coupling capacitor to a power bus. In some example implementations, a decoupling capacitor can be selectively coupled to and decoupled from a supply and return conductors on a power bus. Selective coupling is controlled by a power good signal from a hot swap controller that is separate from the decoupling capacitor. In the absence of a power good signal, the decoupling capacitor is decoupled from the power bus. However, when the power good signal is present, the decoupling capacitor is coupled to the power bus. In this manner, the decoupling capacitor is not coupled to the power bus during the initial phase of a connection of an electrical device to a power bus and the power up of the electronic device. However, once the power good signal is generated, the decoupling capacitor is coupled to the power bus, and provides a fast voltage source to smooth voltage transients resulting from load current transients.

Figure 1:
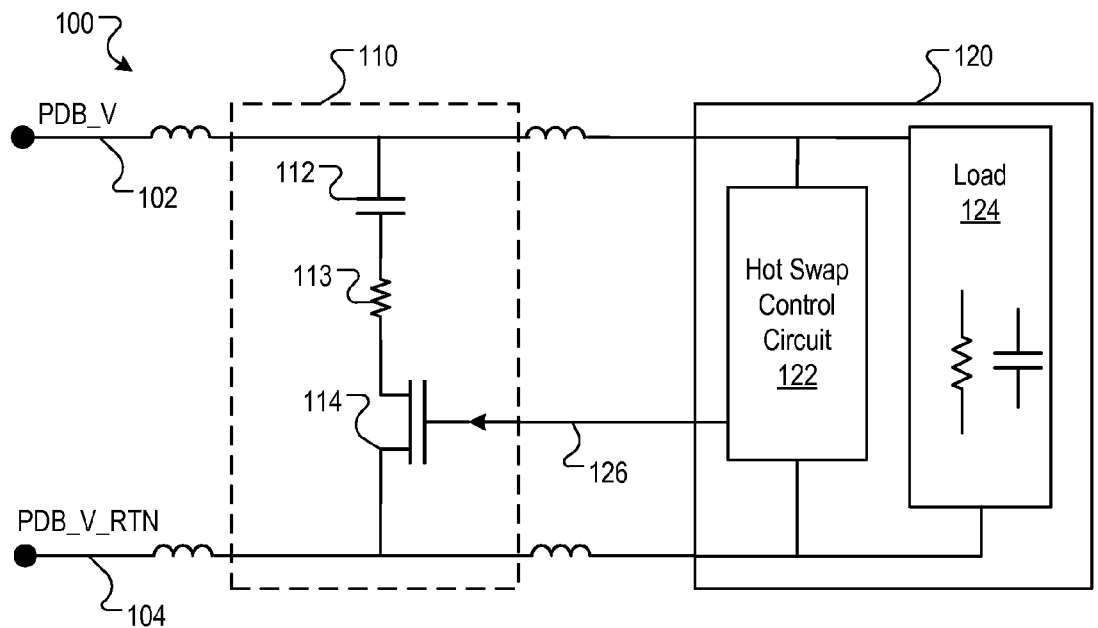
FIG. 1 is a circuit diagram of a circuit that incorporates hot swap decoupling during a hot swap power up.

FIG. 1 is a circuit diagram of a circuit 100 that incorporates hot swap decoupling during a hot swap power up. The circuit 100 depicts an electrical device 120 that has been connected to a power bus that includes a first conductor 102 and a second conductor 104. The first conductor provides a supply voltage, and the second conductor 104 provides a return. A selective decoupling capacitor circuit 110 is connected to the conductors 102 and 104. The selective decoupling capacitor circuit 110 can, in some implementations, be integrated into the electrical device 120, or, alternatively, can be integrated into a rack device that receives the electrical circuit 120. The power bus conductors have an inherent inductance, as represented by the inductors in the in each conductor 102 and 104.

In some implementations, the selective decoupling capacitor circuit 110 includes a capacitive load and a switching device. In some implementations, that capacitive load is a capacitor 112, and the switch is a field effect transistor 114. The RC time constant can be selected by including an optional resistor 113, and/or by selection of Rds(ON) of the field effect transistor 114. Other impedances can also be used, such selection of additional reactive impedance by use of an inductor in serial connection with the capacitor 112.

A first terminal of the capacitor 112 is connected to the first conductor 102 of the power bus, and a second terminal of the capacitor 112 is connected to one of either the source or drain terminals of the transistor 114. The other of the source or drain is connected to the second conductor 104. The transistor 114 forms a switch that, depending on the voltage signal applied to the gate of the transistor 114, selectively couples or decouples the coupling capacitor 112 between the first and second conductors 102 and 104.

The electrical circuit 120 includes a hot swap control circuit 122 and other circuitry that is generally modeled as an electrical load 124. The hot swap control circuit 122 is configured to be in electrical connection with the electrical load 124 and monitors an electrical state of the load 124 while the load 124 transitions from an unpowered state to a fully powered state in response to being connected to the first and second conductors 102 and 104 of the power bus. The hot swap control circuit 122 can be any appropriate hot swap control circuit, and can monitor the electrical state by one or more of current sense circuits, voltage sense circuits, and other sensing circuits. The hot swap control circuit 122 include an output 126 on which the circuit 122 outputs a first signal indicative of the electrical state of the load meeting a first threshold during the transition from the unpowered state to the fully powered state, and outputs a second signal indicative of the electrical state of the load not meeting a first threshold during the transition from the unpowered state to the fully powered state. The first signal is generally referred to as the "power good" signal.

The hot swap control circuit 122 is shown in parallel with the load circuit 124. The topology, however, is an abstraction, and the actual connection varies according to the particular hot swap control circuit utilized. For example, the hot swap control circuit 122 may incorporate a current limiter or other switching device in series with the load 124 to control the load inrush current while the load 124 is powered up.

The gate input of the transistor 114 receives the output 126 of the hot swap control circuit 122. The transistor 114 is in the open state when the second signal is output by the hot swap control signal or when floating, and is in the closed state when the first signal, the power good signal, is output.

Figure 2:
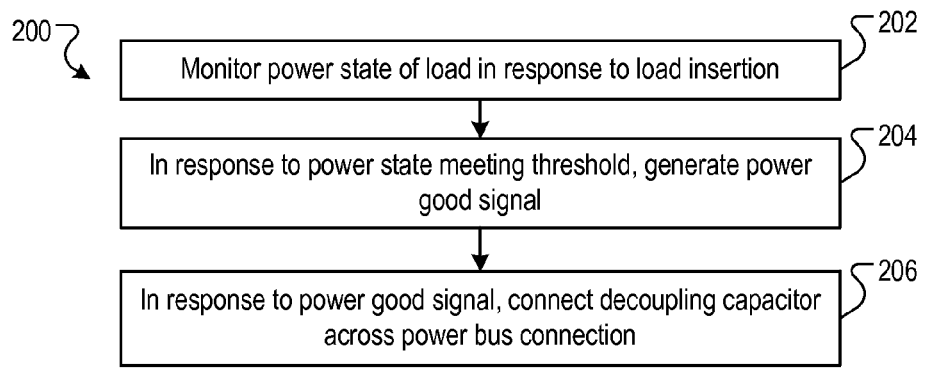
FIG. 2 is a flow diagram of an example process for hot swap decoupling.

Operation of the circuit 100 is described with reference to FIG. 2, which is a flow diagram of an example process 200 for hot swap decoupling. In operation, the electrical circuit 120 is inserted into the rack, thereby coupling the electrical circuit 120 to the power bus conductors 102 and 104. The hot swap control circuit 122 monitors the power state of the load 124 as the load 124 transitions from an unpowered state to a powered state (202). Because the load 124 is initially unpowered, the output 126 is in the second state, indicating the load circuit 124 has not powered up to at least the threshold level at which the power good signal is generated. Accordingly, the transistor 114 is in an open state, and the second terminal of the capacitor 112 is not in electrical communication with the second conductor 104 of the bus.

Eventually the load circuit 124 powers up to the first threshold level. The threshold level may be less than a fully powered state and greater than an unpowered state, e.g., an 80% capacitive charge of the load 124. In response to the power state of the load circuit 124 meeting the threshold, the power good signal is generated on the output 126. The presence of the power good signal at the gate of the transistor 114 causes the transistor 114 to act as a closed switch, which, in turn, electrically couples the second terminal of the transistor 114 to the second conductor 104 of the power bus. The coupling capacitor 112 is thus introduced into the circuit.

The introduction of the separate coupling capacitor 112 at this point in time will not have deleterious effects on the power supply voltage because, for example, the voltage has already reached a threshold level, e.g., 80% of its final value. The capacitive charge on the load 124 will assist in charging the coupling capacitor 112, which reduces the inrush current required to charge the coupling capacitor. Furthermore, the absence of the coupling capacitor 112 during power up and prior to the generation of the power good signal does not render the bus susceptible to transients, as the hot swap control circuit 124 controls the power up of the load circuit 124.

The circuit 100 can be implemented in a variety of different ways. For example, in some implementations, a rack can be configured without any decoupling capacitors, and the selective decoupling capacitor circuit 110 and the hot swap control circuit 122 can be included in each electrical circuit 120. Alternatively, the selective decoupling capacitor circuit 110 can integrated into the rack and the coupling between the rack and the electrical circuit 120 can be configured so that the hot swap control circuit 122 output 126 is coupled to the gate of the transistor 114 upon insertion of the electrical circuit 120. In yet another implementation, the selective decoupling capacitor circuit 110 and the hot swap control circuit can be integrated into each rack slot that receives the load circuit 124.

Furthermore, other control circuits instead of the hot swap control circuit can be used to control the capacitor circuit 110. For example, a high impedance monitoring circuit can be connected in parallel with the hot swap control circuit and generate the output signal that controls the capacitor circuit 110. The output signal can be subject to a threshold voltage that is different from the threshold voltage at which the "power good" signal of the hot swap control circuit is generated.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments. Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus, comprising:
  a capacitive load having first and second terminals, the first terminal configured to be in electrical connection with a first conductor of a power bus;
  a switching device having first and second terminals and a control input, the first and second terminals being in electrical connection when the switching device is in a closed state and being in electrical isolation from each other when the switching device is in an open state, wherein:
    the first terminal of the switching device is in electrical connection with the second terminal of the capacitive load; and
    the second terminal of the switching device is configured to be in electrical connection with a second conductor of the power bus; and
  a hot swap control circuit configured to be in electrical connection with a load that is powered by the first and second conductors of the power bus, wherein the load is separate from the capacitive load; and
  wherein:
    the hot swap control circuit monitors an electrical state of the load while the load transitions from an unpowered state to a fully powered state in response to the load being connected to the first and second conductors of the power bus, wherein:
    the hot swap control circuit outputs a first signal indicative of the electrical state of the load meeting a first threshold during the transition from the unpowered state to the fully powered state, and outputs a second signal indicative of the electrical state of the load not meeting a first threshold during the transition from the unpowered state to the fully powered state; and
    the input of the switching device receives the output of the hot swap control circuit and is in the closed state when the first signal is output by the hot swap control circuit to connect the capacitive load in parallel with the load so that the capacitive load forms a decoupling capacitor in parallel with the load, and is in the open state when the second signal is output by the hot swap control circuit so the capacitive load is not connected to the second conductor of the power bus while the load is connected to the first and second conductors of the power bus.

2. The apparatus of claim 1, wherein the switching device is a field effect transistor.

3. The apparatus of claim 1, wherein the capacitive load is a capacitor.

4. The apparatus of claim 1, wherein the first conductor of the power bus is a power supply conductor and the second conductor of the power bus in a power return.

5. The apparatus of claim 1, wherein the first threshold is a powered state that is less than a fully powered state and greater than an unpowered state.

6. The apparatus of claim 1, further comprising a resistor in serial connection with the capacitor.

7. An apparatus, comprising:
  a server rack configured to receive computer servers and electrically connecting each computer server to a power bus that includes a first conductor and a second conductor;

a capacitive load having first and second terminals, the first terminal be in electrical connection with the first conductor of the power bus;

a switching device having first and second terminals and a control input, the first and second terminals being in electrical connection when the switching device is in a closed state and being in electrical isolation from each other when the switching device is in an open state, wherein:

the first terminal of the switching device is in electrical connection with the second terminal of the capacitive load;

the second terminal of the switching device is in electrical connection with a second conductor of the power bus; and the control input is configured to be in electrical connection with an output of a control circuit when a computer server is received in the server rack, the control circuit in electrical connection with server, wherein the server is separate from the capacitive load; and wherein:

the control circuit monitors an electrical state of the server while the server transitions from an unpowered state to a fully powered state in response to being connected to the first and second conductors of the power bus, wherein:

the control circuit outputs a first signal indicative of the electrical state of the server computer meeting a first threshold during the transition from the unpowered state to the fully powered state, and outputs a second signal indicative of the electrical state of the computer server not meeting a first threshold during the transition from the unpowered state to the fully powered state; and the switching device, in response to the output of the control circuit, is in the closed state when the first signal is output by the control circuit to connect the capacitive load in parallel with the server so that the capacitive load forms a decoupling capacitor in parallel with the server, and is in the open state when the second signal is output by the control circuit so the capacitive load is not connected to the second conductor of the power bus while the server is connected to the first and second conductors of the power bus.

8. The apparatus of claim 7, wherein the switching device is a field effect transistor.

9. The apparatus of claim 7, wherein the capacitive load is a capacitor.

10. The apparatus of claim 7, wherein the control circuit is a hot swap control circuit.

11. The apparatus of claim 7, wherein the first threshold is a powered state that is less than a fully powered state and greater than an unpowered state.

12. A method, comprising:

monitoring, by a hot swap control circuit, an electrical state of load that is powered by the first and second conductors of a power bus, the monitoring occurring at least while the load transitions from an unpowered state to a fully powered state in response to the load being connected to the first and second conductors of the power bus;

in response to the monitoring, generating, at an output conductor:

a first signal indicative of the electrical state of the load meeting a first threshold during the transition from the unpowered state to the fully powered state;

a second signal indicative of the electrical state of the load not meeting a first threshold during the transition from the unpowered state to the fully powered state;

coupling the output conductor to a switching device that receives the outputs of the hot swap control circuit and is in a closed state when the first signal is output by the hot swap control circuit and is in an open state when the second signal is output by the hot swap control circuit;

while the load is connected to the first and second conductors of the power bus:

coupling a capacitor, by the switch, between the first and second conductors of the power bus when the switch is in the closed state to connect the capacitor in parallel with the load so that the capacitor forms a decoupling capacitor in parallel with the load; and decoupling the capacitor, by the switch, from the first and second conductors of the power bus when the switch is in the open state so the capacitor is not connected to the second conductor of the power bus while the load is connected to the first and second conductors of the power bus.

13. An apparatus, comprising:

a hot swap control circuit configured to be in electrical connection with a load that is powered by first and second conductors of the power bus, and that monitors an electrical state of the load while the load transitions from an unpowered state to a fully powered state in response to the load being connected to the first and second conductors of the power bus, wherein:

the hot swap control circuit outputs a first signal indicative of the electrical state of the load meeting a first threshold during the transition from the unpowered state to the fully powered state, and outputs a second signal indicative of the electrical state of the load not meeting a first threshold during the transition from the unpowered state to the fully powered state; and means for connecting a capacitive coupling between the first and second conductors of the power bus when the second signal is output to connect the capacitive coupling parallel with the load so that the capacitive coupling forms a decoupling capacitor in parallel with the load and for disconnecting the capacitive coupling between the first and second conductors of the power bus when the first signal is output so the capacitive coupling is not connected to the second conductor of the power bus while the load is connected to the first and second conductors of the power bus.

* * * * *